(No Model.)
F. TRIER.
MACHINE FOR TRUING GRINDSTONES.
No. 263,444. Patented Aug. 29, 1882.
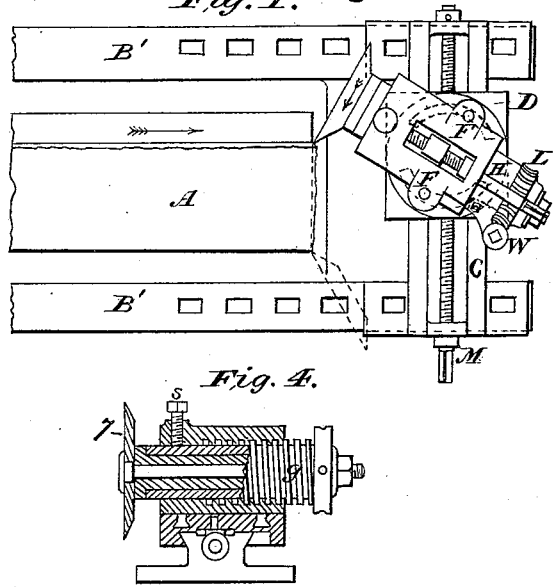
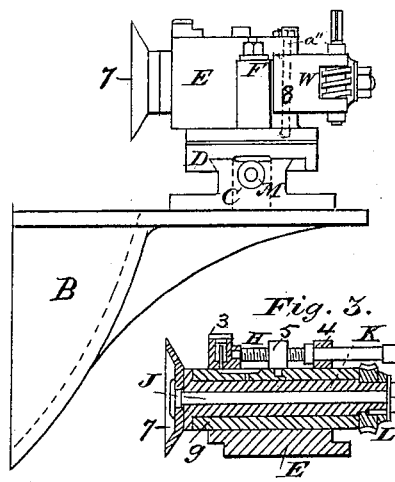
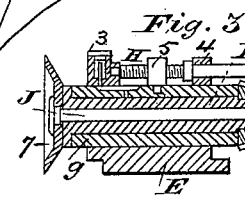
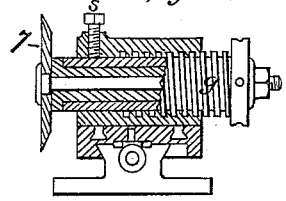
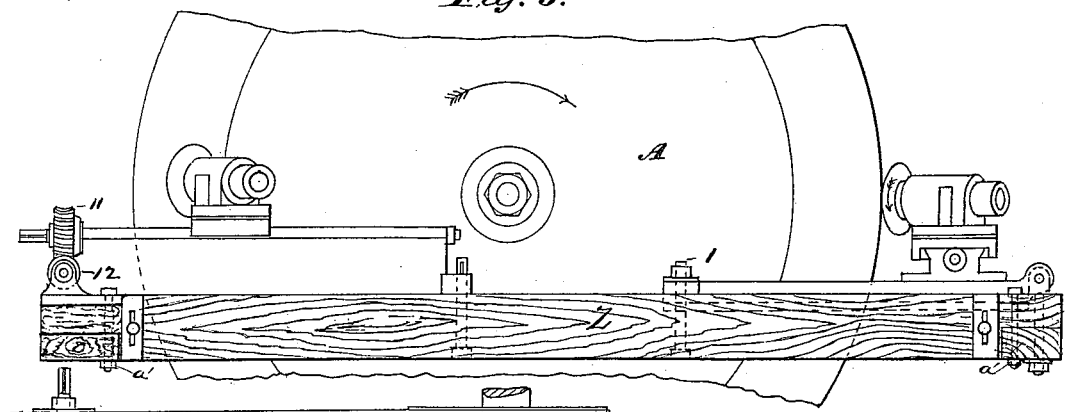
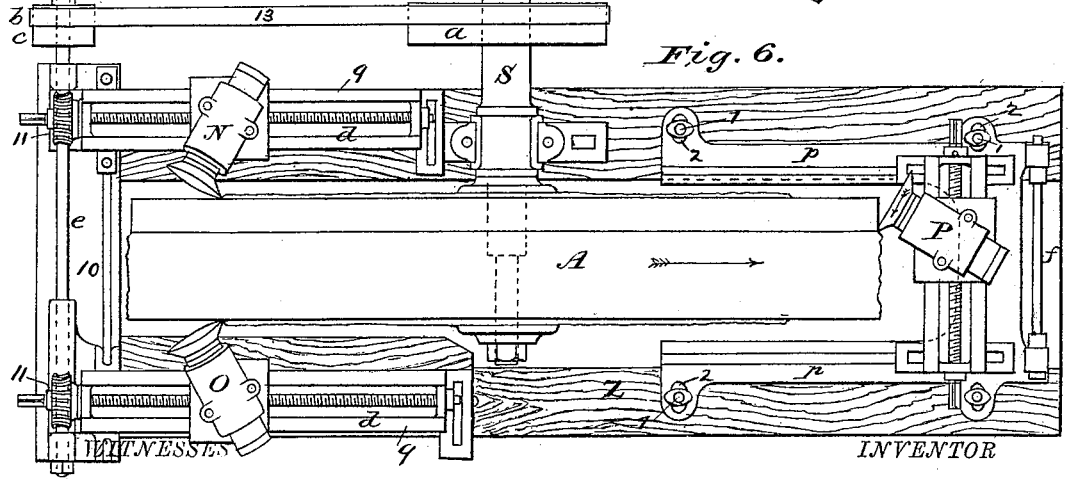
WITNESSES
N. D. Adams.
H. M. Heaton
INVENTOR
Frank Trier
Attorney
N. PETERS. Photo-Lithographer, Washington, D. C.

UNITED STATES PATENT OFFICE.

FRANK TRIER, OF BOSTON, MASSACHUSETTS, ASSIGNOR TO A. C. BALDWIN, OF SAME PLACE.

MACHINE FOR TRUING GRINDSTONES.

SPECIFICATION forming part of Letters Patent No. 263,444, dated August 29, 1882.

Application filed May 10, 1882. (No model.)

*To all whom it may concern:*

Be it known that I, FRANK TRIER, a subject of the Queen of Great Britain, a citizen of London, England, temporarily residing at Boston, in the county of Suffolk and State of Massachusetts, have invented certain new and useful Improvements in Machines for Manufacturing and Truing Grindstones; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the application of circular metallic cutters which are free to turn on their axis when brought in contact with the revolving stone to be dressed, thereby truing the face of the stone to a mathematical certainty; and to this end my invention consists in the arrangement of the cutting-disks in relation to the stone to be operated upon, and in details of construction hereinafter more fully set forth, and pointed out in the claims.

Figure 1 is a top view, showing the cutters as operating on the grinding-edge of a grindstone. Fig. 2 is a view in perspective of the edge trimmer or cutter. Fig. 3 is a sectional view of the cutter, showing the working or operating parts. Fig. 4 is a sectional view of a modification. Fig. 5 is a side elevation of the frame on which the cutters are mounted, showing a portion of the stone. Fig. 6 is a top view, showing all the cutters in position for dressing the edge and sides of the stone.

It is highly important in factories where grindstones are used in the edging of tools or in grinding metals that such grindstones be true on their grinding-face. Much time is now lost and labor and expense consumed in truing the grindstones of factories, &c., as all other work is suspended and the lathes, benches, and other tools and work are covered up to prevent injury to them from the flying dust, and from one-half to a whole day is consumed in truing the grindstones. It is to obviate this waste of time and labor that I have devised the mechanism to be more fully hereinafter explained.

A represents a grindstone revolving in a trough of water, B. The trough is supported by a suitable frame-work, B', which not only supports the grindstone in suitable bearings, but also the cutters for dressing the stone. The stone may, however, be mounted on a separate frame from the cutters; but in either case the supporting frame or frames should be rigid and true, so that the edge of the cutters can at all times be presented to the stone to be dressed in true lines parallel with the edge and sides of the stone. The trough may, however, be a portable one, and so constructed that it can be passed under the grindstone and then filled with water and the frame in which the stones are mounted used for attaching the cutters and cutter-holders thereto.

C is a slide adjustably secured to the frame, and adapted to be placed nearer to or farther from the stone to be operated upon by any suitable means when the face of the stone is to be trued, as shown in Fig. 1.

In the manufacture of grindstones the slide-irons $p$ $p$ may be used, and are secured to the frame-work by means of bolts 1, passing through the frame B' and through slots 2 in the slide-irons. The rear end of the slide irons or bars $p$ $p$ are connected by a rod, S, after the manner of a hinge-joint, so that the bolts 1 can be withdrawn and the slide-bars, together with the cutting mechanism, turned back out of the way.

The slide C carries the tool-holder P, which consists of the cross-slide D and box E, which are pivoted together and adapted to be turned to any desired angle, and secured in such position by set-screws F F, working in slots in the slide D, as shown in dotted lines in Fig. 1.

In the box E is secured a sleeve, $g$, which is movable backward and forward to and from the stone by means of the screw H. The screw H is seated in lugs 3 4, formed in the top of the box E.

5 is a screw-nut, one side of which is secured to the sleeve $g$, while the screw H passes through the center thereof, so that by turning the screw H by means of the crank 6 or other suitable device the sleeve $g$ is moved backward or forward, as occasion may require, and thus regulate the depth of cut. The sleeve $g$ may, however, be screw-threaded, so as to mesh with like screw-threads cut in the box E, as shown in Fig. 4, and which is given as a modification.

K is a spindle working within the sleeve $g$, to which the cutter 7 is attached by means of the bolt J.

L is a worm-wheel secured to the spindle K, and meshes with the worm W when desirable, so that when the cutters (such as shown in Fig. 3) are to be sharpened all that is necessary is to place the cutter at the proper plane or angle to the stone, and by turning the worm W cause the cutter to revolve against the stone. The worm W is removably mounted on an arm, 8, by means of a pivot-pin, $a''$, or hinge, so that it can be withdrawn and placed out of engagement with the worm-wheel L when the cutter is at work, to allow the same to revolve freely by its contact with the stone.

The slide D is moved on slide C and across the face of the stone by means of screw M, secured to the slide C and working in a screw-threaded connection on slide D, whereby the cutter is fed up to the stone, and as the cutter comes in contact with the stone to be dressed it begins to roll with the same circumferential velocity and acts as a rolling sharp wedge in removing the inequalities of the stone.

In order to preserve the edges of the stone, it is advisable to dress, say, half-way across the face of the stone, and then turn or reverse the cutter, as shown in dotted lines in Fig. 1, and finish from the other side, and thus avoid the breaking off of the edge of the stone; and in like manner the cutter may be adjusted to finish the stone with an "arris" face, if such is desirable.

The mechanism just described is designed especially for truing the grinding-faces of worn grindstones; but it is obvious that it can be used in connection with devices to be presently described in the manufacture of grindstones from the rough stones.

I will now proceed to describe the devices for automatically truing the sides of grindstones.

9 9 are slide-bars secured to the sides of the frame B' in any suitable manner, and are secured together at their outer ends by a cross-bar, 10. Secured in suitable bearings in the slide-bars 9 9 are mounted the screw-shafts $d$ $d$, on which are mounted the cutter-carrying slides N and O, which are of substantially the same construction as already described. The ends of the screw-shafts are provided with worm-wheels 11 11, which mesh with worm-gears 12 12 on the shaft $e$, secured to the bed-plate or cross-bar 10. The shaft $e$ is provided with a fast and loose pulley, $b$ and $c$, over which a driving-belt, 13, passes, said belt being passed over the pulley $a$ on the shaft S, on which the stone to be dressed is mounted. By this arrangement the cutter-carrying slides N and O are automatically fed to the work along the screw-shafts $d$, from the skirt to the eye of the stone, and the sides thereof accurately dressed, while the pressure of the two cutting-disks on opposite sides of the stone will serve to hold the same firmly in its proper position to be acted upon by the cutters. The face-cutter is moved back and forth and fed to the work by hand.

To facilitate the mounting and removal of the stone after it has been dressed, the slide-bar 9 of the slide O is pivoted to the cross-bar $e$, so that it can be swung around out of the way.

The side bar, Z, of the frame B' is made removable, so that it can be readily detached, so that by turning the slide which carries the edge-cutter back out of the way, as has been heretofore described, and swinging the slide-bar 9 of the slide O out of the way, the bar Z can be readily removed and access readily had to the stone and shaft S, on which it is mounted. The side bar, Z, is held in position on the end bars by means of screw-bolts $a'$ $a'$, which being withdrawn allows the bar Z to be removed.

I am aware that cutters have been arranged on both sides of a revolving wheel for the purpose of truing or turning the felly; that such cutters have been driven by belts, &c., and adapted to be adjusted to or from the hub of the wheel, and such I do not claim; but,

Having thus described my invention, what I claim is—

1. In a machine for dressing and truing grindstones, the cross-slide D and box E, in combination with the sleeve $g$, having the cutter-carrying spindle secured therein, and operating-screw H, as and for the purpose set forth.

2. The combination of the cutter-carrying spindle K, provided with the worm-wheel L, with the detachable worm W, whereby the cutter is adapted to be turned against the face of the stone to grind or sharpen said cutter, as set forth.

3. In a machine for manufacturing grindstones, the combination of cutters arranged to operate on both sides of the stone, and adapted to be moved simultaneously and automatically, by means of devices substantially such as described, from the skirt toward the eye or axis of the stone, whereby both sides of the stone are accurately dressed and the stone held against lateral displacement, as set forth.

4. The combination of the slide-bars 9 9, cross-bar 10, with the screw-shafts $d$ $d$, carrying the cutting devices, worm-wheels 11 11, worm-gears 12 12, and driving-shaft $e$, whereby the cutters are automatically fed to the work, as set forth.

In testimony whereof I affix my signature in presence of two witnesses.

FRANK TRIER.

Witnesses:
N. D. ADAMS,
F. M. HEATON.